United States Patent [19]
Lin

[11] Patent Number: 5,613,304
[45] Date of Patent: Mar. 25, 1997

[54] FOOT DRYER WITH WEIGHT SCALE

[76] Inventor: Jack Lin, 9F3R,No.210, Chung Hsueh Rd., Tainan, Taiwan

[21] Appl. No.: 493,540

[22] Filed: Jun. 22, 1995

[51] Int. Cl.⁶ .................................................. F26B 19/00
[52] U.S. Cl. .............................. 34/90; 34/536; 34/427; 177/245; 177/264; 392/380
[58] Field of Search .................. 34/60, 233, 202, 34/90, 448, 463, 536, 543, 554, 80, 89.1, 237, 523; 392/380; 177/245, 264

[56] References Cited

U.S. PATENT DOCUMENTS

| | | | |
|---|---|---|---|
| 3,378,009 | 10/1965 | Peplin | 34/202 |
| 4,210,216 | 7/1980 | Godden | 177/34 |
| 4,782,601 | 11/1988 | Gonzalez | 34/233 |
| 5,157,850 | 10/1992 | Terng-Shuh | 34/202 |
| 5,475,933 | 12/1995 | Ueda | 34/90 |

*Primary Examiner*—John M. Sollecito
*Assistant Examiner*—Steve Gravini

[57] ABSTRACT

A dryer and weigher comprising an upper housing for containing a sole dryer structure and a lower housing for containing a weigher structure, the upper housing and the lower housing weighing the weight of a user, the sole dryer structure having a heater and a fan turned on and off either simultaneously with a common switch or with separate switches for each of two air chambers provided in the upper housing.

7 Claims, 9 Drawing Sheets

FOOT DRYER WITH WEIGHT SCALE

BACKGROUND OF THE INVENTION

This invention concerns a dryer and weigher, particularly having two functions of drying two soles of a user and weighing the body weight of the user.

Figure 1:
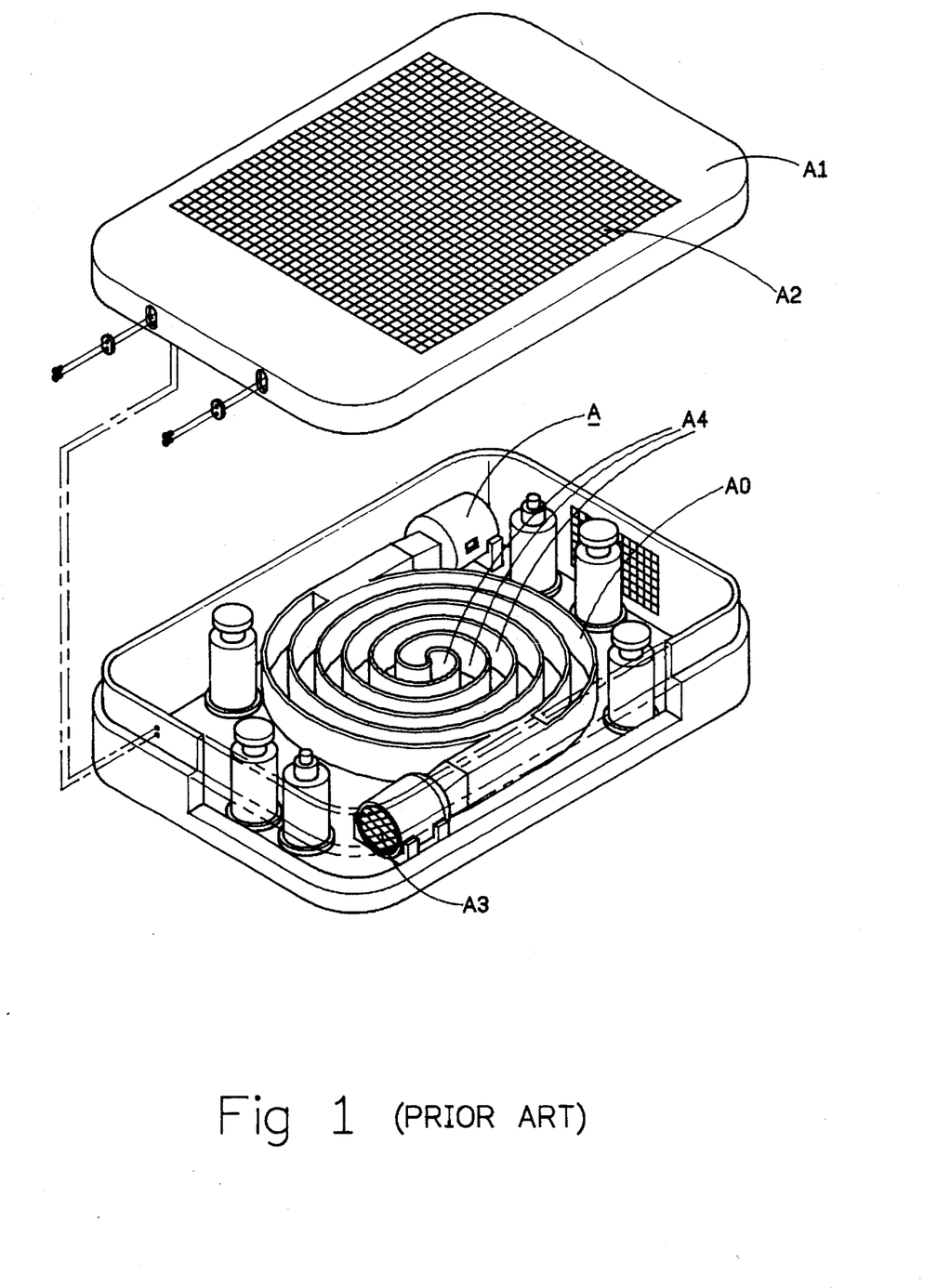
FIG. 1 is an exploded perspective view of a first conventional dryer.
Figure 2:
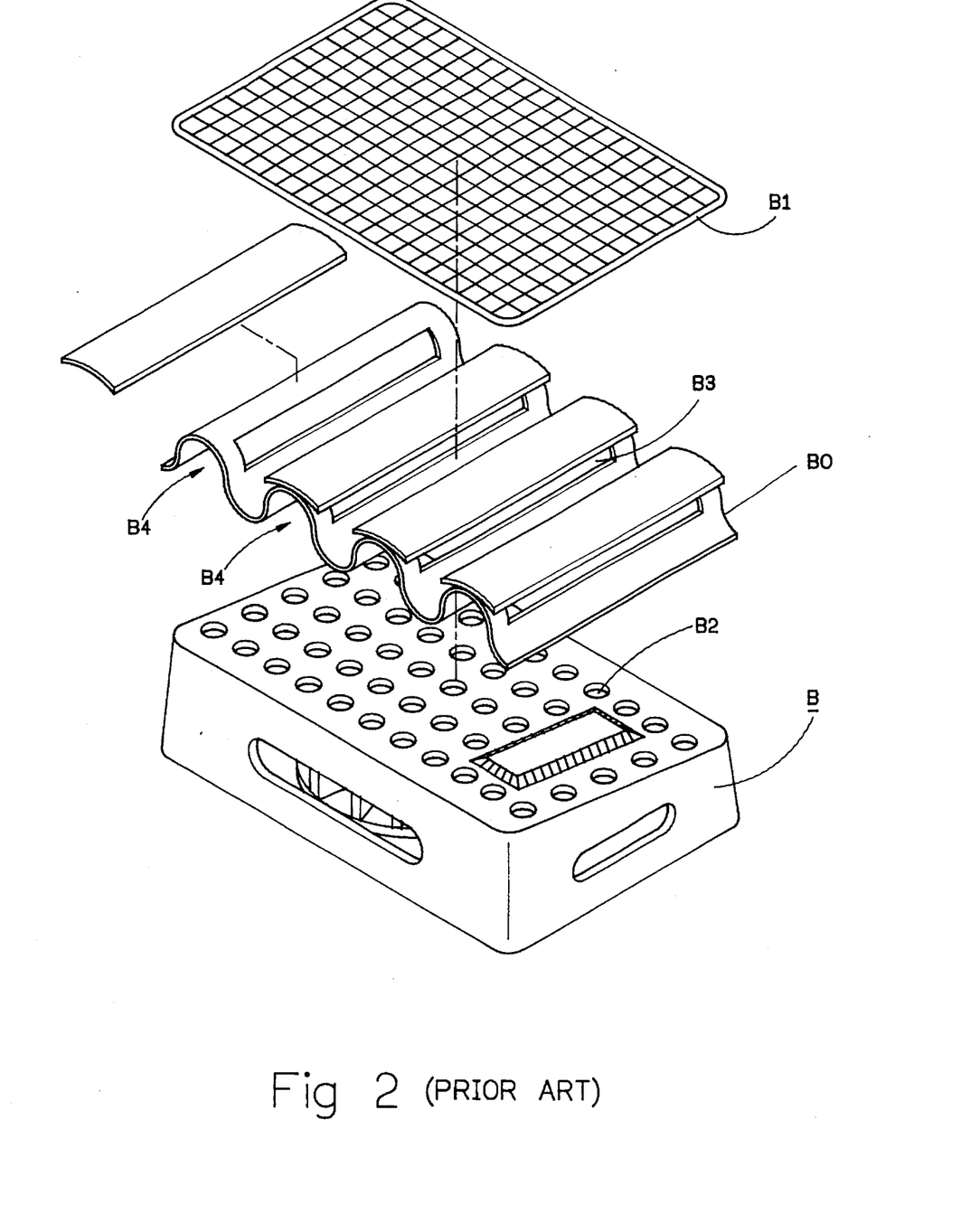
FIG. 2 is an exploded perspective view of a second conventional dryer.

There are two kinds of conventional sole dryers shown in FIGS. 1 and 2, and that in the FIG. 1 has a motor A, and a spiral passageway AO for air sucked in by the motor A through a air inlet A3 of the spiral passageway to flow along therein and to flow up via an open upper surface thereof and flow out of many small air holes in an upper lid A1. This structure has defaults of loss of air flow and substantive air pressure needed for sending air around the spiral passageway, and comparatively large air force going out of an outer portion of the spiral passageway and hot air flowing out of an inner portion of the spiral passageway.

The conventional dryer shown in FIG. 2 has a wave-shaped water guide plate BO on top of a housing B, a net B1 on the water guide plate BO. Then hot air produced by the housing B flowing up through air holes B2 in an upper wall of the housing B and then pass through air outlets B3, but hot air also can flow out of openings B4 at two opposite sides of the water guide plate BO, with hot air passing through the net B1 decreasing not a little.

SUMMARY OF THE INVENTION

An object of this invention is to offer a dryer and weigher, having two functions of drying soles of a user and weighing the body weight of the user.

A feature of a dryer and weigher in the present invention is an upper housing for containing two air chambers of a sole profile and an electric heater to heat air coming in through an air tube and an electric fan to blow hot air into the two air chambers and then to flow out of many air holes in an upper wall of the air chambers for drying soles of a user, and a lower housing containing a weighing structure therein, and the upper housing and the lower housing are combined together by means of a pair of L-shaped hooks provided with the upper housing and a pair of coil springs provided with the lower housing.

Another feature of the present invention is separate or common switches for the heater and the fan for each of the two air chambers to supply hot air or room temperature air separately or simultaneously to dry one sole or two soles according to necessity.

DETAILED DESCRIPTION OF THE INVENTION

Figure 3:
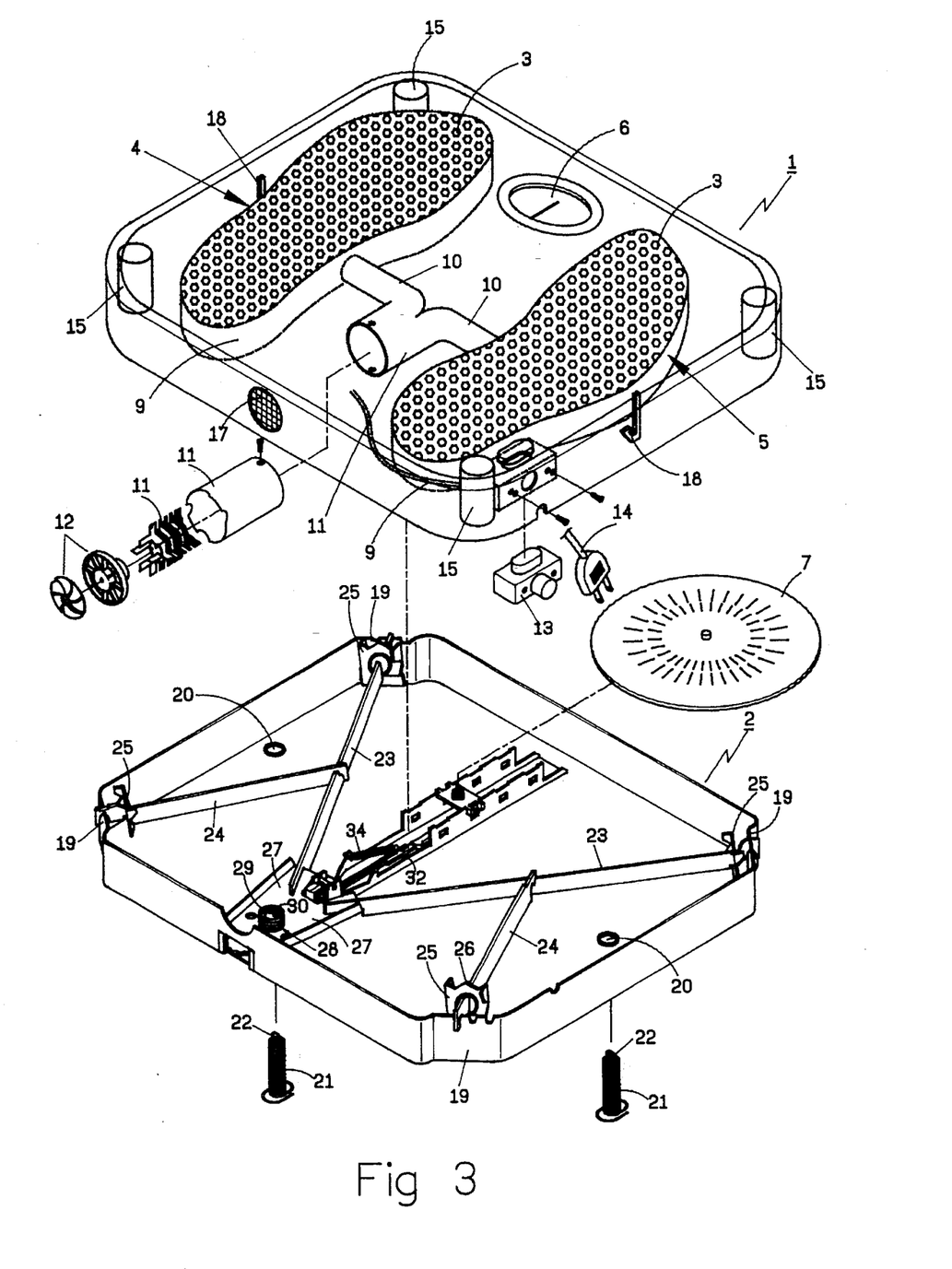
FIG. 3 is an exploded perspective view of a first embodiment of a dryer and weigher in the present invention.
Figure 4:
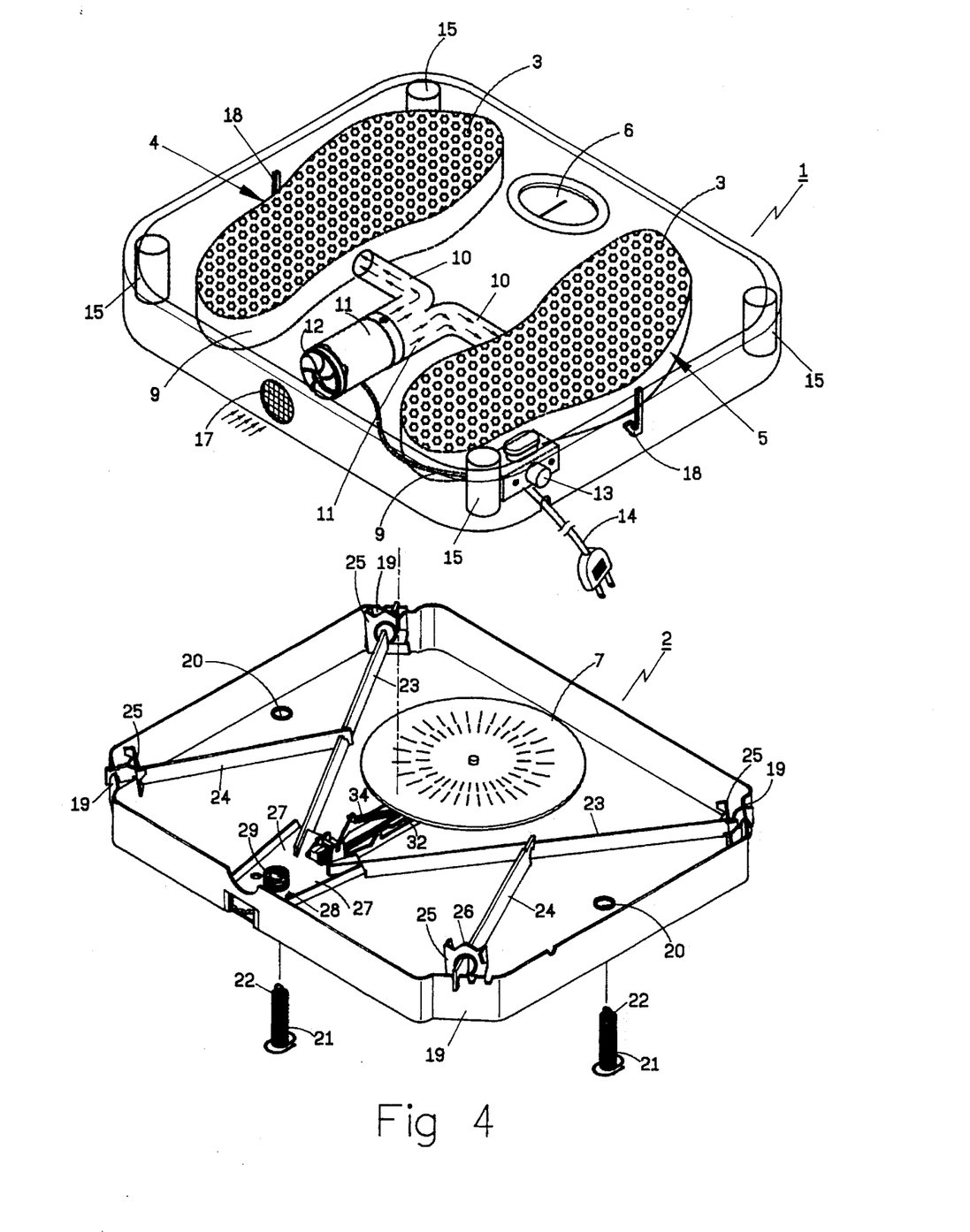
FIG. 4 is a part cross-sectional view of the first embodiment of the dryer and weigher in the present invention.
Figure 5:
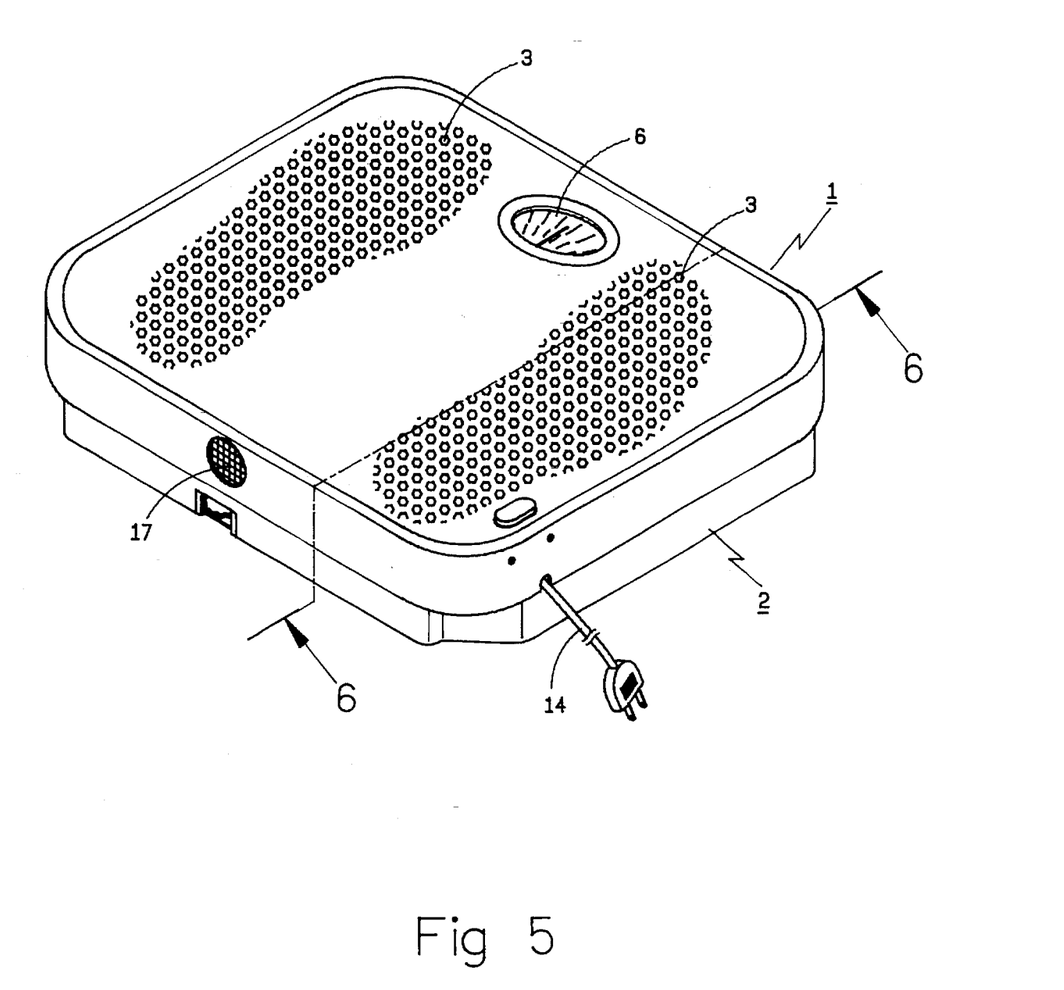
FIG. 5 is a perspective view of the first embodiment of the dryer and weigher in the present invention.

A first embodiment of a dryer and weigher in the present invention, as shown in FIGS. 3 and 4, comprises an upper housing 1, a lower housing 2 combined together.

Figure 7:
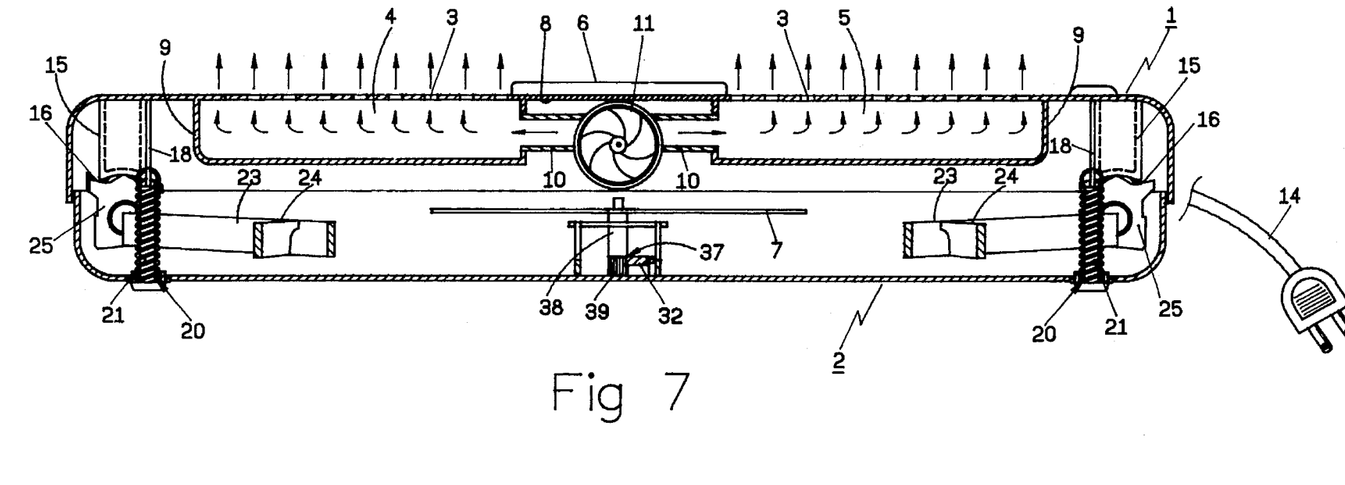
FIG. 7 is a cross-sectional view of the first embodiment of the dryer and weigher in the present invention.

The upper housing 1 has two groups of many small air holes 3 in an upper surface just on two air chambers 4 and 5 provided under the upper surface and shaped as a sole in profile, a transparent window 6 on the upper surface between the two groups of the air holes 3 for looking at a scale 7 showing the body weight of a user. Each air chamber 4 or 5 has a vertical circumferential wall 9 extending down from a lower surface 8 of the upper wall of the upper housing 1. An air tube 10 is provided to extend out of an inner side of the vertical circumferential wall 9 and connected with a housing tube of an electric heater 11 and an electric fan 12. The housing tube has its front end fixed with an air hole 17 in a rear side of the upper housing 1 so that air may be sucked by the fan into the housing tube and then heated by the heater 11 and to be blown into the air tubes 10, 10, the air chambers 4 and 5 and finally out of the small air holes 3. A power switch 13 is further provided inside the upper housing 1, connected with a cord 14 to turn on or off to supply power to the heater 11 and the fan 12. A post 15 is respectively provided at four inner corners of the upper housing, extending down from the upper wall, and higher than the circumferential walls 9 of the two air chambers 4 and 5 as shown in FIG. 7, having a bottom concave surface 16 in its bottom to rest on a ridge 26 of each supporter 25 provided in the lower housing. In addition, an L-shaped hook 18 is fixed respectively on an inside surface of each of two opposite sides of the upper housing.

Figure 6:
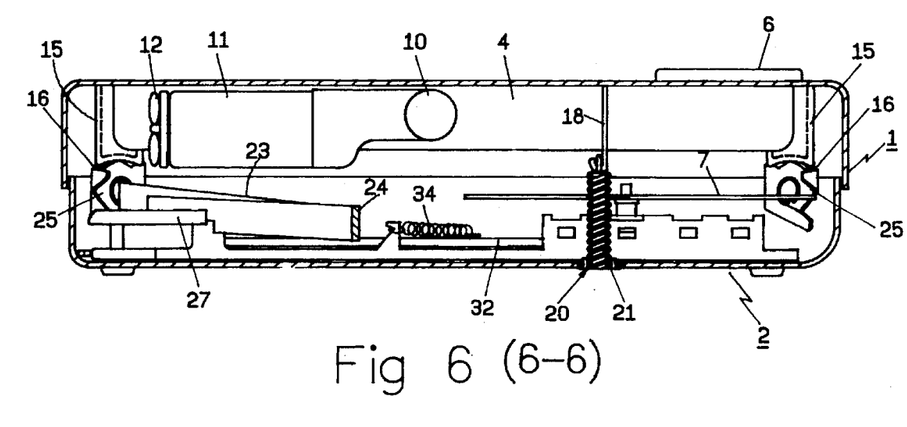
FIG. 6 is a cross-sectional view of line 6—6 in FIG. 5.
Figure 8:
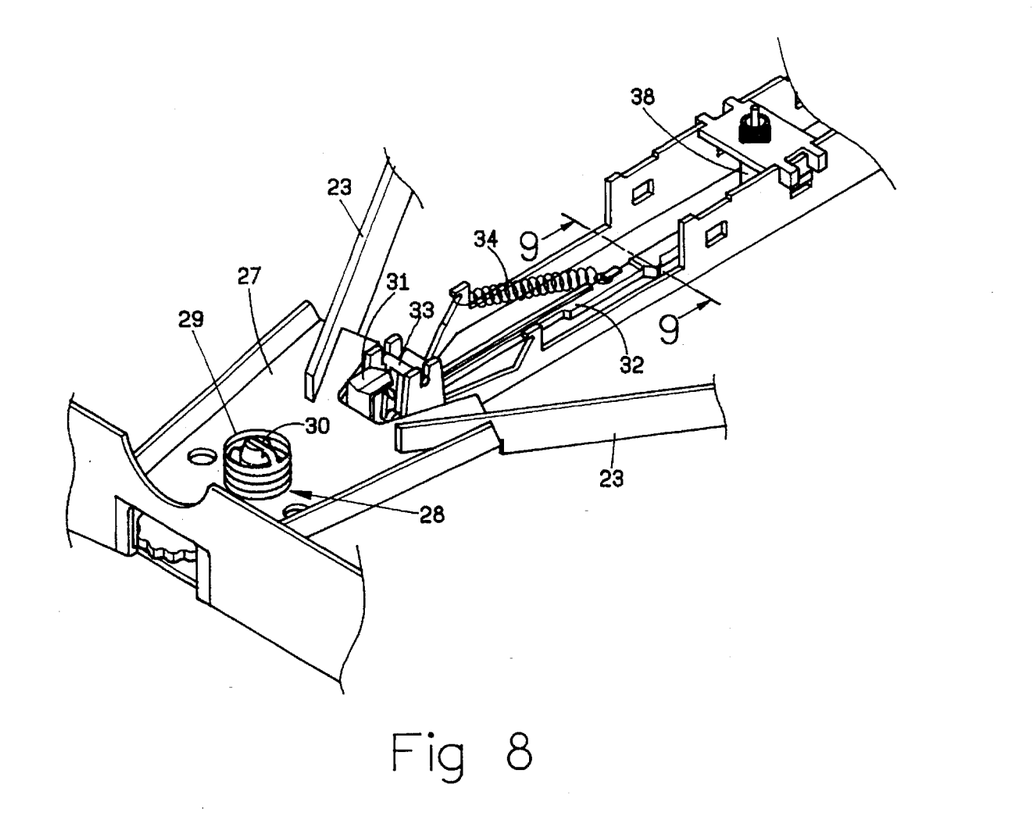
FIG. 8 is a perspective view of a weigher structure of the first embodiment of the dryer and weigher in the present invention.
Figure 9:
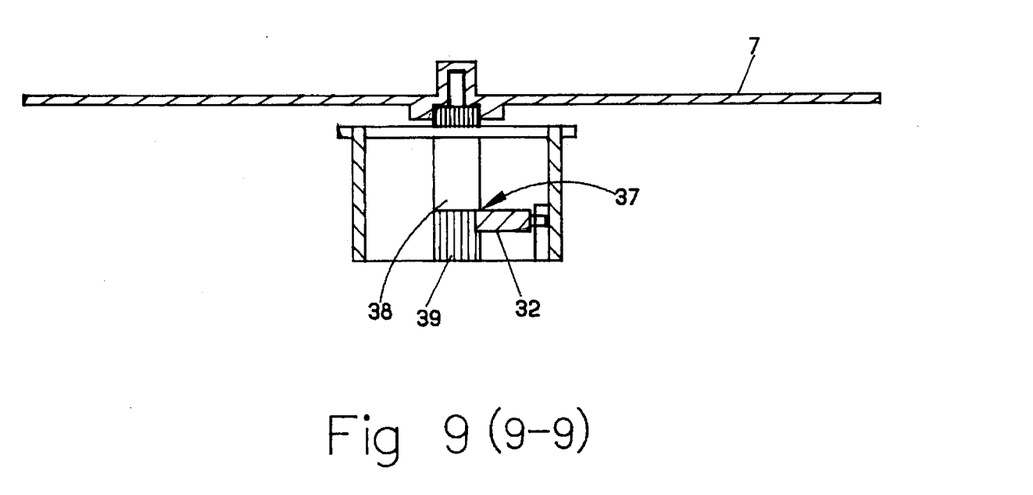
FIG. 9 is a cross-sectional view of line 9—9 in FIG. 8.

The lower housing 2 has a spring hole 20 respectively in two opposite sides of a bottom wall for a coil spring 21 to fit up through from under, the coil spring 21 having an upper hook 22 to hook the L-shaped hook 18 of the upper housing 1 so as to secure the upper housing 1 with the lower housing 2 in combining the both together, as shown in FIGS. 6 and 7. The lower housing 2 also has a short corner side 19 to connect in an obtuse angle with each two neighboring sides, a long connecting flat rod 23 respectively fixed to extend nearly diagonally from each of two short corner sides 19 of a rear side thereof, a short connecting flat rod 24 respectively fixed to extend from two short corner sides 19 of a front side thereof, and each of the connecting flat rod 24 having its end hooked the center of each of the connecting flat rod 23 in almost a right angle. Besides, each connecting flat rod 23 or 24 is fixed firmly in its position with a supporter 25 having an upper ridge 26, which is to receive and support the bottom concave surface of each post 15 of the upper housing 1 so that the connecting flat rods 23, and 24 may cooperate when the upper housing 1 is pressed down heavily by the weight of a user. The end of each connecting rod 23 is welded with an upper surface of a supporting block 27, which has a hole 28 for a spring 29 to fit upward. A shaft rod 30 is provided in the spring 29 to support the support block 27, and the block 27 may be pressed down whenever the connecting rods 23, 24 are pressed down with the spring 29 being pressed down. Then a hook rod 31 provided at the front of the block 27 is also pressed down to move an activating rod 33 connected with a transmitting rod 32 of the disc scale 7 as shown in FIG. 8, so the transmitting rod 32 is to be moved by the activating rod 33, with a spring 34 hooked with the transmitting rod 32 pulling th same back to its original position. The transmitting rod 32 has a toothed surface 37 to engage with a toothed surface 39 of a support shaft 38 of the disc scale 7 so that the movement of the transmitting rod 32 can rotate the support shaft 38, which then rotates the disc scale 7 to show the weight of a user.

Figure 10:
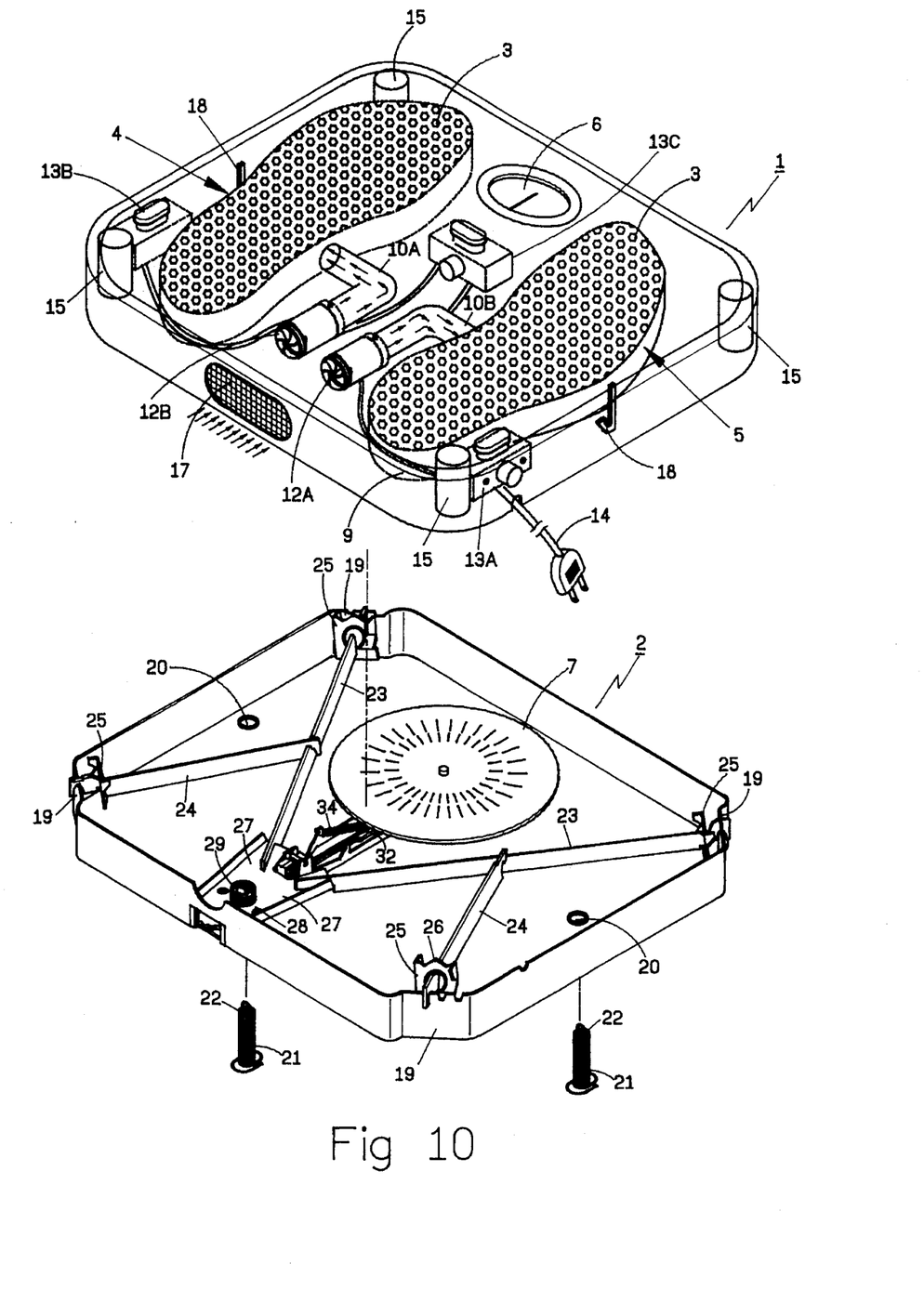
FIG. 10 is a part perspective view of a second embodiment of the dryer and weigher in the present invention.
Figure 11:
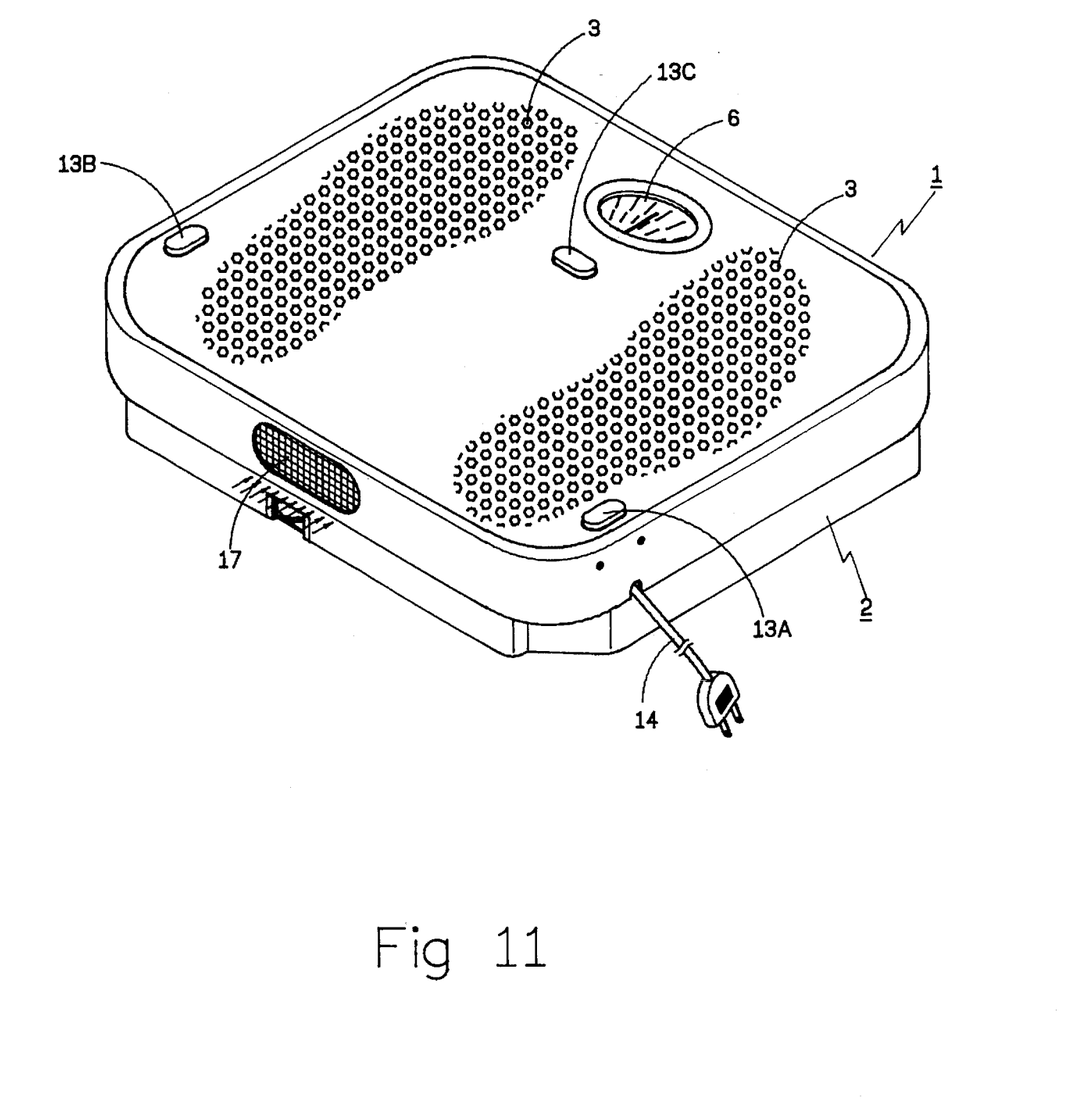
FIG. 11 is a perspective view of the second embodiment of the dryer and weigher in the present invention.

A second embodiment of a dryer and weigher in the present invention, as shown in FIG. 10, comprises almost the same structure of the first embodiment, except that separate air tubes 10A, 10B are provided with two air chambers 4 and 5 and that the air tubes 10A and 10B respectively receives therein an electric heater and an electric fan connected either separately with a power switch 13A or 13B for turning on and off the heater and the fan separately, or a common power switch 13C for turning on and off both the appliances simultaneously. In addition, all the power switches used in the first or the second embodiment shown in FIGS. 3, 4 and 10 have three-stage changeover function, namely, supplying hot air or room temperature air (with the electric fan on and with the heater off) to allow the dryer and weigher produce two kinds of air controlled by a user.

The reason of the second embodiment provided with two separate switches is based on the convenience for drying either only one sole or two soles of a user at a time.

What is claimed is:

1. A dryer and weigher comprising:

an upper housing having two groups of small air holes in an upper surface of an upper wall just on two air chambers provided under the upper surface and having a vertical circumferential wall extending down from a lower surface of the upper wall and having a sole-shaped profile, an air tube connected with an inner side of the vertical circumferential wall of each air chamber, said air tubes of the two air chambers connected with a housing tube of an electric heater and an electric fan and located within said upper housing, a power switch fixed inside said upper housing an connected with said electric heater, said electric fan and the power cord to turn on and off the heater and the fan, a post provided at each of the four corners and extending down from the upper wall, and having a bottom concave surface on the bottom end;

a vertical L-shaped lever respectively provided on an inner surface of two opposite side walls of said upper housing;

a lower housing having a bottom wall, a spring hole respectively in each of two opposite sides of the bottom wall, a coil spring provided to fit up through each of the two spring holes and having an upper hook to hook with the lower end of each said vertical L-shaped hook, each of four short corner sides connected in an obtuse angle respectively with each two neighboring sides, two long connecting flat rods extending nearly diagonally from two short corner sides of a rear side thereof, two short connecting flat rods extending nearly diagonally from two short corner sides of a front side thereof, each said short flat rod having its end hooked at the center of each relative long connecting flat rod, the end of each long connecting flat rod welded on a support block described below;

a support block having a spring hole for a spring to fit through upward, a shaft rod fitted in the spring to support the support block, a hooking rod provided at a front side for pressing an activating rod connected with a transmitting rod of a disc scale, said transmitting rod having a toothed surface to engage with a toothed surface of a support shaft of the scale; and characterized by said heater and said electric fan started by said power switch to produce hot air to blow into said two air chambers of said upper housing, said hot air flowing through out of the two groups of said air holes of said upper housing to dry the soles of a user, said weigher structure of said dryer and weigher able to weigh the body weight of the user when the user stands on the upper wall of said upper housing.

2. The dryer and weigher as claimed in claim 1, wherein said four posts at four corners of said upper housing are a little higher than said circumferential walls of said two air chambers, allowing said weigher structure function.

3. The dryer and weigher as claimed in claim 1, wherein said two air chambers are located within said upper housing.

4. The dryer and weigher as claimed in claim 1 wherein two of said air chambers are provided within said upper housing.

5. The dryer and weigher as claimed in claim 1, wherein only one of said air chamber is provided within said upper housing.

6. The dryer and weigher as claimed in claim 1, wherein each of said air chambers is connected with an air tube in which an electric heater and an electric fan are fixed.

7. The dryer and weigher as claimed in claim 6, wherein said electric heater and said electric fan are either respectively turned on and off by separate switches or by a common power switch.

* * * * *